United States Patent Office 2,763,681
Patented Sept. 18, 1956

2,763,681

CHLORTETRACYCLINE, PURIFICATION AND ALKALINE EARTH SALTS

Edward Everett Starbird, Nanuet, and Charles Pidacks, Spring Valley, N. Y., assignors to American Cyanamid Company, New York, N. Y., a corporation of Maine No Drawing. Application June 25, 1953, Serial No. 364,182

8 Claims. (Cl. 260—559)

This invention relates to the purification of chlortetracycline and has for its object novel procedures of isolating chlortetracycline by separation from fermentation mash materials.

This application is a continuation-in-part of an application Serial Number 62,722 filed November 30, 1948, entitled, "Isolation of Aureomycin" and of an application Serial Number 62,766 filed November 30, 1948, entitled, "Isolation of Antibiotic," both applications having been abandoned in favor of the present application.

Chlortetracycline is an antibiotic produced by the organism Streptomyces aureofaciens as described in U. S. Patent 2,482,055 entitled, "Aureomycin and Preparation of Same" to Benjamin M. Duggar dated September 13, 1949.

Chlortetracycline is produced and sold under the commercial designation of "Aureomycin" which name, in certain countries, is a trademark of the American Cyanamid Company. Chlortetracycline has been found to be a naphthacene derivative and while having a structure which strongly suggests tautomeric forms, is believed to exist with the following probable structure:

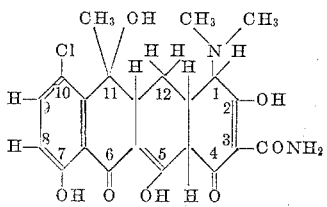

A numbering system is shown for the molecule. One proper name for the compound is 1-dimethylamino-4,6-dioxo-10-chloro-11-methyl-2,4a,5,7,11-pentahydroxy-1,4,-4a,6,11,11a,12,12a-octahydronaphthacene-3-carboxamide. A generic term for the compound is chlortetracycline, sometimes spelled "chlorotetracycline," which is consistent with the name oxytetracycline for Terramycin as suggested in the Journal of the American Chemical Society, 74:4976 (1952).

Chlortetracycline is an amphoteric material, exhibiting both acidic and basic characteristics. For therapeutic purposes, the acidic or basic salts or the neutral material may be used.

For separation from the fermentation mash, we find that comparatively water-insoluble salts are formed within the range of about pH 6 to 10 and above, with the alkaline earth metals, calcium, barium, strontium and magnesium. Also, comparatively water-soluble salts are formed with mineral acids such as hydrochloric, sulfuric, phosphoric and nitric and strong organic acids such as acetic at a pH of about below 3. The chlortetracycline in the fermentation mash is separated from water-soluble impurities by dissolving the chlortetracycline as the acid salt below about pH 3 and from water-soluble materials by isolating the solid phase as the salt of chlortetracycline with calcium, barium, strontium or magnesium at a pH of above about 6. The two separations may be conducted with either step as the initial separation. The separations may be repeated to obtain further purification.

The acid water solution may be extracted with an organic solvent such as described and claimed in our copending application Serial Number 129,184 filed November 23, 1949 entitled, "Recovery of Aureomycin" now Patent 2,655,535; similarly the chlortetracycline salt precipitate may be extracted with an organic solvent as described in our copending application Serial Number 184,515, filed September 12, 1950, entitled, "Extraction of Aureomycin."

The acid solution as such, or after being dried, may be used as a component for animal feeds or otherwise administered. The alkaline earth salts of chlortetracycline as separated initially or after being dried, may be used as a component of animal feeds or otherwise administered. Preferably, the calcium or magnesium salts are so used, as barium and strontium in large quantities may be toxic. Purified salts of chlortetracycline, particularly the calcium and magnesium salts are very useful for administration to humans.

If the pH is above 10 during the separation of the alkaline earth salts the rate of inactivation of the chlortetracycline in such an alkaline medium requires a rapid handling of the isolated solid phase.

The solid phase may contain considerable quantities of calcium hydroxide or calcium carbonate without causing complications. At least one equivalent of the alkaline earth metal is required per mol of chlortetracycline for a reasonably economical recovery of chlortetracycline and two or more equivalents is preferred. Calcium, for example, forms a salt of the formula $(C_{22}H_{21}O_8N_2Cl)$ Ca through the replacement of two hydrogens by calcium. The partial calcium salt which contains only one equivalent of calcium replacing one hydrogen is also insoluble and if the alkaline earth salts are rapidly precipitated down this salt may be the predominant form, though it is not an equilibrium form in the presence of adequate quantities of the alkaline earth metal and the additional alkaline earth ion reacts slowly with the solid phase to replace the second hydrogen. More than two equivalents of the alkaline earth metal ion is normally desired to give a rapid formation of the precipitate, and by common ion effect cause more of the chlortetracycline to separate out in the isolatable solid phase.

The alkaline earth metal salts of chlortetracycline are normally amorphous and do not exhibit a sharp melting point. The calcium salt, for example, decomposes over a range of about 280° C. to 300° C. with gradual darkening at the lower temperature and more rapid decomposition as the temperature rises. In contrast thereto, neutral chlortetracycline, sometimes called the free base, has a melting point of about 169–170° C., uncorrected, with decomposition. Acid salts have a shorter decomposition range; the hydrochloride, for example, starts to darken at about 208° C. with decomposition at about 235° C.; the temperatures of all of the decompositions varying somewhat with the rate of heating and the exact equipment being used.

The alkaline earth metal salts of chlortetracycline may be easily identified by ashing the salt and analyzing for the alkaline earth metal content in the ash; and by adding hydrochloric acid to the salt to lower the pH to about 1.5 and establishing the presence of the hydrochloride salt of chlortetracycline by an infra-red spectrum or other method as set forth in the Duggar Patent 2,482,055.

A convenient rapid quantitative method of measuring the chlortetracycline content of such salts is to dissolve a sample of the alkaline earth metal salt in 0.01 normal hydrochloric acid, using a size of sample estimated to contain 25 micrograms per milliliter of solution, and comparing the absorption by the sample of transmitted light of 368 millimicron wavelength with a sample of chlortetracycline of known purity.

Prior methods of purification of antibiotics produced by fermentation are usually based upon an extractive process under varying conditions with organic solvents. By this invention it has been found that chlortetracycline possesses peculiar properties such that certain alkaline earth metallic salts are only slightly soluble in aqueous solutions in the pH range of 6.0 to 10. The more useful of these salts are the calcium, barium, magnesium and strontium salts. Particularly useful because of commercial availability and low price of the raw material is the calcium salt resulting from the use of calcium oxide or hydroxide or carbonate. The calcium, if used as the oxide, upon mixture with water is present as calcium hydroxide in which form it is best used for this invention. Other bivalent metallic hydroxides such as barium, strontium and magnesium also give highly advantageous results, but because of their toxicity or higher cost, it is generally preferred to use calcium hydroxide. The hydroxide may be added as such, or formed in place by the reaction of a soluble salt of the metal and a base. In some fermentation mashes, sufficient of the bivalent metal is already present, or part of the requirements are obtained from this source. Sodium hydroxide, potassium hydroxide, lithium hydroxide, and ammonium hydroxide may be used to make the material alkaline with advantageous results if one of the bivalent metals is already present. Sodium, potassium or ammonium hydroxides are particularly advantageous when there is already calcium present to form the insoluble calcium salt, and the sodium, potassium or ammonium hydroxide is used mainly for pH control. Ammonium does have a bit of a disadvantage because of its strong odor and the larger quantities necessary for pH control but does have compensating advantages in its low cost, ready recoverability and ease of removal.

The preferred pH range for the separation is fairly broad. It depends upon the particular mash used, the concentration of chlortetracycline in the mash, the cations present, temperatures, and other variables. In one particular mash, an initial separation at a pH of 6.2 permitted about 25% of the total yield to remain in the filtrate, while a pH of 7 permitted a loss of 15%. A pH of 8.5–10 gives a higher recovery, and reduces the loss at this point.

With the pH of the fermentation mash adjusted to within the range of 6 to 10, the mash may be filtered, or the solids otherwise separated, with the larger proportion of the chlortetracycline being present in an insoluble form, and retained with the mycelium in the filter cake, permitting the discard of the filtrate which contains a majority of the soluble impurities which are most difficult to remove from the chlortetracycline in its purification. Dependent upon plant conditions, it is frequently found that a small amount of filter aid added to the mash before the filtration will give a more rapidly filtering cake and a cake from which the chlortetracycline may be more readily extracted. The use of diatomaceous earth is quite an advantage in filter presses although practically any of the standard filter aids is thoroughly satisfactory.

As a preferred process, the cake is washed. Ordinary tap water may be used if sufficient of the bivalent metal is retained in the cake. With calcium hydroxide, in normal quantities, this is the case, if the tap water in a particular area is unusually acid, it may be desirable that it be neutralized before use. The washing is not essential, but is useful because it removes certain impurities which would otherwise have to be separated later.

The chlortetracycline can be separated from the cake by two convenient methods. One of these is based upon the formation of a soluble chlortetracycline salt with acids below a pH of 3, and the other is based upon the solubility of chlortetracycline in certain organic solvents. The two methods are not completely independent in that normally in the acid purification process the acid extract is again made alkaline, with the same group of metallic ions, and the precipitate from the second precipitation may then be treated with the solvent and the chlortetracycline extracted from that cake by the use of solvents. This cake will be found to contain practically no fats and the later separation of fats is then not necessary. It is to be distinctly understood that in any of the processes of purification of chlortetracycline, it cannot be said that any step is absolutely essential because a repetition or combination of other steps together with the selection of center cuts of precipitates and other modifications will give yields of chlortetracycline but such yields and methods do not give the remarkably high yields of comparatively pure material which is obtained by following the methods herein set forth by example. Certain modifications in the order of steps may be accomplished and still give fair yields of the chlortetracycline. The exact pH's herein given are for the preferred yields. The alkaline precipitations give better yields if a range around 8.5 to 10 is used, but pH ranges outside of these limits give reduced yields, which for many purposes are adequate, it not as satisfactory as the narrower range.

ACID PURIFICATION OF ALKALINE EARTH SALT

The washed cake may be suspended in water and acidified to a pH of approximately 1 to 3, with a pH near 1.5 being preferred. Any of the mineral acids or strong organic acids may be used. The lower limit of pH 1 is normally established more by the corrosion characteristics of plant equipment than by inherent process limitations. If glass equipment is used, a pH considerably below 1 may be safely used but has no particular advantage and requires more acid. The suspended solids are then filtered. The chlortetracycline is more soluble hot, and temperatures as high as 80° C. for a short time will generally not cause undue decomposition. The extract may be single or multiple and for best results may embrace a total volume of from about ¼ to 2 times the original volume of mash. More or less may be used but outside of these limits the slurry becomes undesirably thick or so dilute as to require unduly large equipment. The suspended solids are then filtered, washed with a dilute acid of approximately the same concentration, and the solids discarded. The filtrate which contains the chlortetracycline may then be made alkaline with the alkaline materials above listed in the presence of one of the bivalent metals listed, and the solids collected. A centrifuge may be used instead of a filter. The filtrate may be discarded and the collected solids recovered. If hydrochloric acid has been used as the acid and calcium hydroxide as the alkaline earth material, at this point the solids will be at least about 25% pure chlortetracycline. The solids may be dried and used for oral administration or for veterinary use without further purification, particularly if it is the calcium or magnesium salts which are so isolated. For human parenteral use, further purification is necessary.

The solids, with or without being dried, may then be suspended in acetone or other organic solvent, in the presence of water, a salt, such as sodium chloride, ammonium sulfate, or other soluble salt added to salt out the chlortetracycline and cause the aqueous and solvent layers to separate more sharply; and the solvent layer separated from the aqueous layer and solids. For good yields, the extraction should be repeated at least once additionally. Either the acidic or basic salts with the ammonia and alkali group are more soluble than the neutral material, or alkaline earth salt, and an alkali, including ammonium hydroxide, or an acid may be added to increase the solubility of the chlortetracycline. The solvent filtrates are then pooled and the solvent evaporated and the concentrated material made acid, the precipitate crystallized and filtered off as the chlortetracycline acid salt.

SOLVENT PURIFICATION OF ALKALINE EARTH SALT

As an alternative method of purification, the filter cake from the original precipitation as a bivalent metallic salt at a pH of from 6.0 to 10 may be purified by extraction with a solvent. Certain solvents will dissolve the chlortetracycline present and leave the residual cake containing the largest portion of the impurities. The extraction may be performed with a solvent which is soluble or miscible with water, such as acetone, methyl ethyl ketone, other ketones, methyl alcohol, ethyl alcohol or other alcohols etc. and may be preferably conducted at a pH of either 8 to 10 or below 3. Normal butanol at a pH of about 1.5 is particularly effective. The solvent is slightly less efficient at the more nearly neutral ranges although at the expense of as satisfactory a recovery, the solvent may be used within this range. If the cake be dried so as to remove water, the extraction may be performed by a non-miscible solvent in which the chlortetracycline is soluble and this particular step performed anhydrously, but for commercial purposes it is generally more convenient to use the wet cake without the additional intermediate step of drying. The cake may be extracted in place on the filter or centrifuge or other separation mechanism, but in larger quantities is generally more efficiently and more rapidly extracted by mixing the cake with the solvent in a mixer which causes an intimate mixing of the solvent and the cake, followed by a separation of the solvent from the cake. This separation may be most conveniently performed by the use of a filter, although again a centrifuge, means for decantation or other means of separation may be used. For best recoveries it is desirable that repeated extraction procedures be used, three or more extractions being normally most economical. A counter-current procedure may be used if equipment therefor is available. The extracted cake is discarded. The solvent extract, or filtrate containing the crude chlortetracycline, is then transferred to an evaporator where at a comparatively low temperature and by the use of a vacuum the solvent is removed from the chlortetracyline. The solvent may be recovered and recycled after suitable purification, including the removal of excess water, if necessary. After the removal of the solvent, normally there will be a certain amount of residual water present with the chlortetracycline; this residual water is made acid to between a pH of approximately 3 and 1/10 normal acid solution, and in this acidity range diluted to a sufficient volume that the chlortetracycline is dissolved. The aqueous solution may be extracted with a water immiscible fat solvent which extract is separated. The solvent may be recovered and recycled. Suitable solvents are chloroform, carbon tetrachloride, etc. The fat solvent step may be omitted as a considerable portion of the fat will be separated at later steps if it is permitted to remain in, but for the purest final product and highest yields, it is normally desirable that such fats as can be readily extracted be removed at this point of the process.

The raffinate aqueous phase is then adjusted to a pH of between 6 and 10 with one of the bivalent metal ions above mentioned being present. At this stage it is generally preferable that calcium or magnesium ions be used because their salts are less toxic than barium or strontium salts, and it is easier to secure a non-toxic product if toxic salts are omitted rather than later separated. The precipitate separated by the addition of the alkaline material is separated. A filter may be used although a centrifuge may be preferable because of the small quantity of solids, and their tendency to clog filters. The separated solids are then re-suspended in water and acidified with hydrochloric acid. It is preferable that a comparatively small quantity of water be used. The acid preferred is hydrochloric acid, the chlortetracycline crystallizing out on cooling as chlortetracycline hydrochloride. The sulfate or the phosphate or other acid salt may be prepared and used for therapeutic purposes. The hydrochloride salt meets with greater acceptability to the medical profession, and hence is generally selected.

INITIAL ACID MASH SEPARATION

The chlortetracycline may be separated from a fermentation liquor by making the liquor acidic to a pH of below about 3, filtering to remove the solids, precipitating the chlortetracycline by increasing the pH of the solution, and separating the chlortetracycline from certain impurities which come down with it in the precipitation step, or otherwise separating the chlortetracycline from the acidic liquor.

The chlortetracycline in the fermentation mash is largely in solution or may be caused to go in solution by lowering the pH to about 3 or less. The pH at the end of the fermentation process may vary from approximately 7 to approximately 4 depending upon the procedures used and the broth. Whereas in the lower portion of this range a preponderance of the chlortetracycline exists in a soluble form, it is found that by lowering the pH to in the neighborhood of 3 or less, all of the chlortetracycline tends to go into solution and there is less tendency for it to be adsorbed or held by the mycelia and other solid portions of the fermentation mash. A pH as high as 5 will give full yields with low yield mash, but in instances where a high yield mash is used, some loss may occur unless the pH is more acid than 5. Salt concentrations, the nature of the cations present, the nature of the filter aid, etc. all influence the recovery at borderline acidities. If calcium, barium, magnesium, strontium, etc. are present, the chlortetracycline is less soluble at the higher pH range than if the mash contains relatively more sodium, potassium or the like as the cationic components, and less of the alkali earth group. In contrast to many other fermentation products, it is found that an acid used to acidify it does not of itself destroy the chlortetracycline. Sulfuric acid, hydrochloric acid, nitric acid, phosphoric acid, and the strong organic acids such as acetic, and their mixtures, are satisfactory, although from a cost standpoint sulfuric acid is normally used in this step because of its low market price. The mash may be acidulated to a pH of 3 to 1.5 with very satisfactory results. Greater acidity is unnecessary as it does not appreciably increase the yields and uses acid unnecessarily. High recoveries are obtained if a sufficient concentration of acid is used to lower the pH to less than 1 but if the pH is markedly less than 1, corrosion problems increase the cost of the liquid containing vessels without any proportionate advantages. The fermentation mash is filtered, or centrifuged, to separate the liquids from the solids, the solids washed, preferably with acidulated water, and the solids discarded. It is desirable to use a filter aid to increase the speed of filtration of the step. Macerated asbestos fiber, finely divided clays, etc., are satisfactory filter aids.

The filtrate is then made more alkaline. Unless there is already an alkaline earth present, it is desirable to add as an alkalizing material one of the alkaline earth hydroxides. Calcium hydroxides, or materials forming calcium hydroxide in the solution, are particularly convenient because of the low cost and the ease of obtaining reasonably pure materials. Strontium hydroxide, magnesium hydroxide or barium hydroxide, or materials which give these hydroxides in alakaline solution are satisfactory. If there is one or more of these divalent ions present, as usually results from fermentation procedures, sodium hydroxide, potassium hydroxide, ammonia or other basic materials may be used to raise the pH.

Depending upon the temperature and concentration, the chlortetracycline starts precipitating when the pH is raised to approximately 6, although the material filters more readily and is more convenient to handle if the pH is raised towards a pH of 10. The pH may be somewhat over 10 without unduly solubilizing the material. At a pH of about 9 to 10, purer fractions are more readily obtained. The solids precipitated as the material is made more alkaline are removed by filtration, or a centrifuge; if desired, with the use of a filter aid, washed and the filtrates discarded. At this point, the solids contain the impure chlortetracycline. The impure chlortetracycline thus collected may be used for therapy, particularly oral use by animals. The toxicity at this point may vary with the strain used in the fermentation. The purity depends to such a large extent upon the mash used, the yields in the mash and other variables that the degree of utility varies widely, but with a high yield mash, the solids may be 25% pure chlortetracycline.

If to be used for animals the material may be acidified with a small quantity of an acid to obtain the more desirable acid salts, as for example, the hydrochloride. For parenteral use, or for human use, it is desirable to further purify the chlortetracycline.

Various procedures may be used in this subsequent purification.

ACID PURIFICATION

A convenient method is to again acidulate the solids collected as for example with any of the acids suitable for the initial acidification step. Sulfuric acid is again a cheap and convenient acid and the solids may be regenerated with one or more portions of a dilute acid. For convenience a counter-current procedure may be used in which the last washes from one batch are used as the first washes for the succeeding batch, and the extraction may be carried out step-wise. The pH may be from well below 1 to approximately 3, although a pH of 1.5 to 2.5 yields particularly satisfactory results. The insolubles are filtered, washed and discarded. The regenerated acid solution is then made more alkaline. Certain impurities may be removed by adjusting the pH to 5.2 to 5.5 with sodium hydroxide, adding an equal volume of acetone, filtering out the thus formed precipitate, and rinsing the precipitate with a small volume of 50% acetone. This step is not necessary if care is used in the preceding steps. The originally regenerated acid solution or the thus purified solution is then made alkaline to a pH of between 8 to 10 with caustic, and after mixing with its own volume of acetone, the chlortetracycline salted out by the use of a salt, such as sodium chloride or ammonium sulfate or other soluble salts which will cause the acetone layer to sharply separate and reduce the acetone solubility in the aqueous layer. The separation may be examined under ultra violet light, and if properly conducted, the acetone layer will show a brilliant yellow while the spent or lower layer is blue. The acetone layer is separated, the water phase again extracted, until by ultra violet light it may be determined that the activity is substantially removed therefrom, the residual aqueous layer discarded, and the acetone extracts concentrated in a vacuum still until the acetone has been substantially removed. Because of the residual water in the acetone layer there remains an aqueous liquid which contains the chlortetracycline as a precipitate. The solution is filtered or centrifuged, and the precipitate washed. The loss of the chlortetracycline may again be determined by the use of ultra violet light. The chlortetracycline as thus formed may be used as such or is conveniently dissolved in methyl alcohol and acidified with hydrochloric acid, and the methyl alcohol removed in a vacuum. If desired, or necessary, the dried product may then be washed with absolute alcohol, to remove color bodies; then with ether and dried.

SOLVENT PURIFICATION

The solids either as separated or dried, from the original alkaline precipitation rather than being dissolved in acid may be extracted with an acidic organic solvent such as the above mentioned acids in acetone, methyl ethyl ketone or other ketone, methyl alcohol, ethyl alcohol, butanol or other alcohol, while being kept at a pH of 3 or less, 1.5 being preferred. The quantity of the solvent will vary widely, depending upon the mash used, the yields of the chlortetracycline in the fermentation, and the degree of purity at the point. Ultra violet light may be used to distinguish the chlortetracycline being extracted. A volume of solvent between 5 and 25% of the volume of mash, in two or more successive extractions will normally give desirable results. Enough must be used to dissolve all of the chlortetracycline. The solvent in the extract is then evaporated, the solids dissolved in acidulated water, and extracted with a fat solvent such as chloroform, carbon tetrachloride or other fat solvent, the solvent extract discarded, and the raffinate adjusted to a pH of 6 to 10 with caustic, the solids collected, the filtrate discarded, the solids acidified with hydrochloric acid, slurried with water, washed and dried, thereby yielding chlortetracycline hydrochloride.

As will be obvious to those skilled in the art, for specialized purposes any or all of the purification steps may be repeated and during any of the extracts or washings, the extracts or washings may be recycled, and the extracts or washings made stepwise or by a counter-current procedure and thereby the yields somewhat increase. Such minor modifications are all within the purview of the instant invention and are to be regarded as included modifications thereof. Certain minor modifications are to be expected because of the variations in particular mashes harvested and the cost and availability of certain of the solvents and/or acids and alkalis; for example, in the alkalizing steps where sodium hydroxide or caustic is indicated, potassium hydroxide or caustic potash is satisfactory from a theoretical standpoint but is slightly more expensive and accordingly commercially the use of the sodium rather than the potassium compound is normally more expedient. Similarly, the hydroxides of barium, strontium or magnesium may be used instead of calcium, but because calcium hydroxide is cheaper and normally more readily obtainable, it is to be preferred in commercial operation, although if for any reason it is not available, the others may be used. Necessarily where barium or strontium are used, care must be taken to insure that all of the barium or strontium is removed in later steps in order that the final material will not contain these poisonous substances.

The following specific examples show certain embodiments of the invention but it is to be understood that it would be impractical to show each modification, as for example, each of the pH's and each of the various permissible alkalis and acids and solvents in connection with each of the other permissible ones. The number of permutations and combinations would necessarily be excessive and the substance of the invention would be thereby obscured by prolixity, obfuscation, and undue verbiage.

*Example 1*

FERMENTATION OF CHLORTETRACYCLINE

The fermentation media was prepared containing by weight

|  | Percent |
|---|---|
| Corn steep liquor (50% solids) | 1 |
| Sucrose | 1 |
| $(NH_4)_2HPO_4$ | 0.2 |
| $KH_2PO_4$ | 0.2 |
| $MgSO_4.7H_2O$ | 0.025 |
| $CaCO_3$ | 0.1 |

Sufficient manganese, copper and zinc were introduced to insure that the amounts present both as impurities in the other material and by addition were at least approximately 0.00033% manganese as $MnCl_2.4H_2O$; 0.00033% copper as $CuSO_4.5H_2O$; and 0.005% zinc as $ZnSO_4.7H_2O$. The medium was sterilized with steam for approximately 20 minutes at approximately 120° C. The natural unadjusted pH of the medium was 6.2–6.4 before sterilization and 6.0–6.1 after sterilized. During the normal fermentation the pH drops to approximately 4.5 to 4.8.

The tank is inoculated with spores from an agar slant of *Streptomyces aureofaciens,* an inoculum of approximately 0.5% by volume being used, the inoculation of course being made aseptically. The amount of inoculum may be varied and a larger amount will decrease the necessary time of fermentation. The fermentation is conducted with agitation or aeration. In large tanks the necessary degree of aeration is more readily accomplished by introduction of air than by the mere use of an agitator. The rate of air flow may be from about 0.2 to 3.0 liters of air per liter of mash per minute, the preferred rate being in the neighborhood of 1 liter of air per liter of mash per minute. Excessive foaming may be controlled by agents such as a higher alcohol or hydrocarbon oil or mixtures thereof, as for example, a 1% solution of octadecanol in lard oil, the sterile anti-foam agent being added aseptically as needed. The fermentation is best conducted at a temperature range of 26–28° C. under positive pressure in the tank to reduce danger of contamination for a period of 24–28 hours. At the end of this time fermentation liquor is withdrawn and treated to recover the chlortetracycline.

Example 2

535 liters of a mash after fermentation were adjusted to a pH of 8.5 with calcium hydroxide. After stirring, the suspension was filtered and the filtrate discarded. The cake was washed with 50 liters of tap water, removed from the filter and suspended in 260 liters of tap water. The suspended cake was adjusted to a pH of 1 with 2 molar sulfuric acid approximately 13 liters being required. The slurry was thoroughly agitated, then filtered and the cake washed with 130 liters of water adjusted to a pH of 1.5 with sulfuric acid. The filtrate and wash water were pooled and adjusted with calcium hydroxide to a pH of 10. The crude chlortetracycline thus precipitated was filtered, the precipitate was suspended in 50 liters of acetone and adjusted to a pH of 1 with hydrochloric acid. To measure the pH of such non-aqueous solutions, a portion of the acetone was mixed with an equal volume of pure water, and the pH measured with a glass electrode. 1 kilo of salt was added and the acetone layer filtered off. The cake was resuspended and treated similarly in a second 50 liters of acetone and the residue again suspended and treated with a third 50 liters of acetone. The residue was discarded. The three filtrates were pooled, and concentrated by evaporation, an amorphous precipitate being formed as the acetone was removed. The precipitate was filtered off, and crystallized in dilute hydrochloric acid, a yield of 140 grams of chlortetracycline hydrochloride being thereby obtained. The chlortetracycline hydrochloride thus obtained may be used as such or may be redissolved in water, placed in individual vials, frozen, the water removed by sublimation, the vials suitably sealed, and the dried product dispensed for therapeutic purposes.

Example 3

A 1600 liter batch of a mash was harvested by adjusting the pH to 8.5 with finely powdered unslaked lime. .1% by weight of the filter aid sold commercially as "Hy-Flo," a diatomaceous earth, was added to the wash. A filter press was pre-coated with a small quantity of "Hy-Flo" and the mash run through the filter press. The cake was washed with 100 liters of tap water. The cake obtained weighed slightly over 300 pounds and contained approximately 36% moisture. The cake was suspended in 800 liters of water and acidified to a pH of 1.5 with hydrochloric acid, and filtered. The cake was again suspended in 400 liters of water, and again filtered, followed by a third suspension in 400 liters and filtration, the last two filtrates being used as the initial acid for suspension of a subsequent batch.

The filtrate was adjusted to a pH of 8.5 with calcium hydroxide and the solids collected in a centrifuge. The use of a filter aid is unnecessary in a centrifuge. There was obtained 20 kilos of an impure product containing approximately 75% water. The thus precipitated chlortetracycline was suspended in an 80% acetone 20% water mixture, the pH adjusted to 1.5 with hydrochloric acid, and the volume to 150 liters, and filtered. The cake was again processed with a similar acetone-water solution, the filtrates combined, the acetone distilled off and the chlortetracycline thus obtained crystallized in the presence of hydrochloric acid. A yield of 52 grams was obtained.

Example 4

A 100 liter batch of mash with an initial pH of 6.1 was adjusted to a pH of 8.5 by the addition of a thick slurry of calcium hydroxide. No filter aid was added, the suspension was filtered, and the filtrate discarded, the cake was not washed. The resultant cake was suspended in 100 liters of water at a temperature of 50° C., the suspension being adjusted to a pH of 1.5 by the use concentrated sulfuric acid added gradually with stirring. The material was filtered and the cake discarded. The filtrate was adjusted to a pH of 8.5 with calcium hydroxide, and filtered. The resultant cake was suspended in 10 liters of acetone, acidified to a pH of 1 with hydrochloric acid, 1 kilogram of sodium chloride added thereto and the acetone separated. The residue was additionally washed with two washes of 5 liters of acetone each. The filtrates were pooled and concentrated under vacuum. An amorphous precipitate was formed as the acetone was removed. The amorphous precipitate was stirred with a small amount of hydrochloric acid in the water which was left after the acetone was removed, a pH of about 1 being used, and a yield of 8.5 grams of chlortetracycline hydrochloride obtained therefrom.

Example 5

A 100 liter batch of mash at a pH of 6.1 was adjusted to a pH of 8.5 by the addition of a thin suspension of calcium hydroxide. The material was mixed thoroughly, then filtered. The filter cake was resuspended in 100 liters of tap water, mixed thoroughly, and again filtered. The filtrate was discarded and contained but a small portion of chlortetracycline. The cake from this filtrate was suspended in 25 liters of water and adjusted to a pH of 1.5 by the addition of dilute sulfuric acid. The mixture was thoroughly stirred and filtered. The cake was washed with an additional 10 liters of water. The filtrate and wash combined were adjusted to a pH of 8.5 with lime water, and filtered. The cake was suspended in 10 liters of acetone and treated as in the preceding example. A yield of 8.5 grams of chlortetracycline hydrochloride of comparatively high purity was obtained.

Example 6

To a batch of 100 liters of mash at a pH of 6.1 was added sufficient calcium hydroxide to raise the pH to 8.5. The mixture was thoroughly stirred and run through a centrifuge. When centrifuged at an equivalent force of 800 times gravity the supernatant fluid was not clear. The material was recentrifuged at a force equal to 1000 times gravity, giving a clear supernatant fluid, which was discarded. A filter aid is not required although one could have been used. The thus separated cake was suspended in 25 liters of water, adjusted to a pH of 1.5 with 2 molar sulfuric acid and re-centrifuged. The clear supernatant fluid was adjusted to a pH of 8.5 with calcium hydroxide and again centrifuged. The separated precipitate was suspended in 10 liters of acetone and treated in accordance with the procedure of Example 4. A yield of 8 grams of chlortetracycline hydrochloride was thereby obtained.

Example 7

To a batch of 1650 liters of mash which was obtained at the end of the fermentation process at a pH of 6.4 was added sufficient barium hydroxide, as a thin slurry, to raise the pH to 8.5. 1% by weight of filter aid was added and the material filtered. The cake was suspended in 400 liters of water at a temperature of 50° C., and the solution was acidified to a pH of 1.5 with 4 normal sulfuric acid. More rapid extraction of the chlortetracycline from the filter cake results from the use of warm water and the resulting materials are handled more conveniently although water at room temperature is satisfactory. The resultant slurry was filtered and the cake discarded. The filtrate was adjusted to a pH of 8.5 with a concentrated solution of barium hydroxide, and filtered. The resultant cake was suspended in 160 liters of acetone, acidified to a pH of 1 with 4 normal sulfuric acid, 1 kilogram of sodium sulfate added, and the acetone layer separated from the residue. An additional wash of 60 liters of acetone was repeated twice, the acetone extracts pooled and the acetone removed under vacuum. The resultant precipitate in water was acidified slightly with sulfuric acid, the water separated off, yielding 125 grams of chlortetracycline as the sulfate. No appreciable amount of barium was present in the resulting product.

*Example 8*

A batch of fermentation mash at a pH of 6.4 containing a total of 650 liters was adjusted to a pH of 8.5 with magnesium hydroxide. Magnesium hydroxide was added as a finely divided solid and sufficient time was allowed for measuring the pH after each addition to allow the magnesium to dissolve insofar as it was soluble, and the pH to stabilize. This requires about 20 minutes after each addition. The mash was filtered, washed and the washed cake suspended in 400 liters of water at 50° C. The resultant slurry was adjusted to a pH of 1.5 with dilute sulfuric acid, filtered, and the cake discarded. The filtrate was adjusted to a pH of 8.5 with additional magnesium hydroxide, the precipitated solids were removed and suspended in 160 liters of acetone and adjusted to a pH of 1 with sulfuric acid. 1 kilogram of ammonium sulfate was added, the acetone layer separated and additionally washed with 2 increments of 50 liters of acetone each, the acetone extracts combined and the acetone evaporated therefrom under reduced pressure. The resulting precipitate was filtered off and crystallized by the use of hydrochloric acid, yielding 125 grams of crystals.

*Example 9*

To 100 liters of fermentation mash with a pH of 6.2 was added sufficient powdered strontium hydroxide to raise the pH to 8.5. 1 kilogram of filter aid was added and the material filtered. The cake was washed in 50 liters of water, then suspended in 25 liters of water at 50° C. The suspension was acidified to a pH of 1.4 with dilute sulfuric acid, mixed thoroughly and filtered. The filtrate was adjusted to a pH of 8.5 with strontium hydroxide, the resulting precipitate filtered and the filter cake suspended in 40 liters of acetone. The pH was adjusted to approximately 1 with sulfuric acid and 2 kilos of potassium chloride added thereto. The resulting solution was filtered, washed with 2 increments of 2½ liters of acetone each, the acetone extracts pooled, evaporated under reduced pressure, concentrated hydrochloric acid added to the precipitate formed in the evaporator, the precipitate caused to crystallize, and filtered out from the cooled solution as chlortetracycline hydrochloride. The crystals were washed with cold absolute alcohol and cold ether, and a yield of 7.9 grams of comparatively pure crystallized chlortetracycline hydrochloride was thereby obtained.

*Example 10*

To 100 liters of mash at a pH of approximately 6.2 was added 1 kilogram of filter aid. The material was filtered and the cake washed with 20 liters of water. Because of the comparatively low pH, even though calcium ions were present in the fermentation mash, approximately 25% of the chlortetracycline was lost at this point with the filtrate. The resultant cake was suspended in 25 liters of water at a temperature of 50° C., adjusted to a pH of 1.2 with nitric acid and filtered. The filtrate was adjusted to a pH of 7 with calcium hydroxide and the resultant precipitated chlortetracycline removed by filtration. An additional loss of approximately 15% of the chlortetracycline occurred at this point because of the comparatively low pH of this solution. The cake was suspended in 10 liters of acetone, 1 kilogram of calcium chloride was added, the acetone layer separated and the residue additionally treated with a 5 liter wash of acetone. The 2 acetone extracts were combined and concentrated under vacuum. An amorphous precipitate was formed as the acetone was removed which was caused to crystallize by the addition of hydrochloric acid, yielding 2 grams of chlortetracycline hydrochloride.

*Example 11*

To 100 liters of mash at a pH of 6.1 was added sufficient calcium hydroxide to raise the pH to 10. The mash was filtered and the cake suspended in 25 liters of water. The pH of the suspension was adjusted to 1 with phosphoric acid, the material filtered and the cake discarded. The filtrate was adjusted to a pH of 10.5 with calcium hydroxide, the resulting cake separated and suspended in 5 liters of acetone. 1 kilogram of ammonium chloride was added, the acetone layer separated and the residue additionally washed with 5 liters of acetone three times. The acetone filtrates were pooled and the acetone evaporated under reduced pressure. An amorphous precipitate was formed as the acetone was removed which was treated with concentrated hydrochloric acid, cooled and the crystalline chlortetracycline hydrochloride separated. The material was dried, yielding 7.5 grams chlortetracycline as the hydrochloride.

*Example 12*

To a batch of a chlortetracycline mash containing 100 liters thereof at a pH of 6.2 was added sufficient calcium hydroxide to raise the pH to 8.5. The mash was filtered and washed, the cake suspended in 25 liters of water, and the pH thereof adjusted to 4 with sulfuric acid. The material was filtered and the cake was discarded. Approximately 50% of the product remained in the cake and was lost because of the high pH used for the treatment. The resulting filtrate was adjusted to a pH of 8.5 with calcium hydroxide, filtered, and the cake suspended in 10 liters of acetone, ½ kilogram of salt added, the acetone layer separated, washed additionally twice with 5 liters each of acetone, the acetone extracts combined and concentrated under vacuum and the amorphous precipitate formed treated with hydrochloric acid as in Example 4. There was obtained a yield of 3.8 grams of chlortetracycline as its hydrochloride.

*Example 13*

100 liters of mash were treated as in the preceding example except that in the initial treatment of the first cake, the pH was adjusted to approximately 3 with sulfuric acid, and filtered. The cake thereupon contained approximately 25% of the product which was discarded. The material was then treated as described in the preceding example and a yield of 5 grams of chlortetracycline as the hydrochloride was obtained.

*Example 14*

100 liters of chlortetracycline mash from the fermentation process at a pH of 6.2 were adjusted to a pH of 8.5 with sodium hydroxide after the addition of 800 grams of barium chloride. The mixture was then filtered, washed with 25 liters of water and the cake suspended in 100 liters of water, adjusted to a pH of 2.9 with acetic acid. The resultant material was filtered and the filtrate adjusted to a pH of 8.5 with calcium hydroxide. The resulting material was filtered and the cake treated as in Example 12. A yield of approximately 4½ grams of comparatively pure chlortetracycline hydrochloride was thereby obtained.

Example 15

To 100 liters of mash at a pH of 6.2 was added sufficient lime as a slurry to form a saturated solution with a small amount of undissolved lime present. The pH of the material was between 12 and 13. The mash was filtered and the cake suspended in 50 liters of water. The pH of the suspension was adjusted to 2 with hydrochloric acid, a considerable amount being required because of the large amount of calcium hydroxide present. The suspension was filtered and the residual cake discarded. The filtrate was then adjusted to a pH of 9.25, the point of greatest insolubility of the chlortetracycline salt, with calcium hydroxide and the resulting cake separated and suspended in 10 liters of acetone. The suspension in acetone was treated in accordance with the procedure of Example 10, yielding 5.5 grams of chlortetracycline as the hydrochloride.

Example 16

A batch of fermented mash containing 323 grams of chlortetracycline by bioassay in 1650 liters of mash was adjusted to a pH of 8.5 by adding 10 normal sodium hydroxide. Approximately 1.5 liters was required. 1% by weight of the filter aid known as "Hy-Flo," a commercial diatomaceous earth, was added, and the mesh filtered through a filter press. The cake was suspended in 175 liters of acetone, the pH adjusted to 10.0 by the addition of 10 normal sodium hydroxide, approximately 500 cc. being required; 16.5 kilos of salt added, the mixture slurried and filtered. The cake was re-extracted similarly with 150 liters of acetone adjusted to a pH of 10 and containing 16.5 kilos of sodium chloride, and the filtrates combined.

The acetone solutions were concentrated in vacuo to 26 liters and the remaining aqueous phase adjusted to a pH of 2 with concentrated hydrochloric acid, approximately 160 cc. being required. The acidified liquor was extracted three times with 5 liters of chloroform. Each chloroform extract was washed with its own volume of water, acidified to a pH of 2.0 with hydrochloric acid. The combined aqueous phases were pooled, filtered and then adjusted to a pH of 7.05 by adding 10 normal sodium hydroxide, approximately 130 cc. being required. The precipitate thus formed was centrifuged, the precipitate suspended in 250 cc. of distilled water and washed, re-separated and then suspended in 600 cc. of distilled water. The slurry thus formed was acidified with concentrated hydrochloric acid added dropwise to a pH of 1.2–1.5. The precipitate at first dissolved and then crystallized out as chlortetracycline hydrochloride. The crystals were washed with 650 cc. of cold absolute alcohol and then a similar quantity of cold ether. A yield of 127 grams chlortetracycline hydrochloride with a purity of 96% was obtained. This is an overall yield of 39.3%.

Example 17

A fermentation tank containing 1650 liters of mash was adjusted to a pH of 8.5 with 10 normal sodium hydroxide. The cake thus obtained was suspended in 250 liters of acetone, the pH adjusted to 10 with 10 normal sodium hydroxide, 16.5 kilograms of salt added and filtered. The cake was washed with 150 liters of acetone, at a pH of 10, which was combined with the original filtrate. The acetone extracts were evaporated leaving an amorphous precipitate with some water, the precipitate was filtered off and crystallized by the use of hydrochloric acid as set forth in the preceding example, giving a yield of 270 grams of chlortetracycline hydrochloride.

Example 18

Fermented mash was acidified to a pH of 2.5 to 3 with 2 molar sulfuric acid, 1% of the filter aid sold as "Hy-Flo SuperCel" added and filtered. To 5 liters of the filtrate containing 1000 units per cc. of the activity was added a 20% solution containing 5 grams of barium chloride and sufficient 10 normal sodium hydroxide to raise the pH to between 9.7 and 10. A small portion of filter aid was added, the mixture filtered and the spent mash discarded. The liquor discarded contained approximately 6.4% of the total activity. The cake obtained could be used for veterinary purposes; but for human parenteral use, the resulting precipitate was suspended in water and acidified with sulfuric acid to a pH of 2, a total volume of 590 ml. being obtained. The regenerated acid solution was adjusted to a pH between 5.2 and 5.5 with 5 N sodium hydroxide and an equal volume of acetone added, the resultant precipitate removed and the resultant filtrate adjusted to a pH of between 9.2 and 9.5. The pH may be readily measured by mixing a portion of the acetone with an equal volume of pure water, and measuring the pH with a glass electrode. 250 gms. of sodium chloride per liter of solution was added and the acetone layer separated. The acetone layer was removed and the water phase again extracted with a smaller volume of acetone, the acetone separated and a third extraction made. The three acetone extractions were pooled and concentrated by vacuum distillation until the acetone was removed. The chlortetracycline thus precipitated out in the residual water was separated by centrifugation, washed with a small volume of water and dissolved in methyl alcohol; then with hydrochloric acid, acidified to a pH of 2.5. The chlortetracycline hydrochloride thus formed was concentrated to dryness under vacuum, and found to be pure enough for therapeutic use. As a further step for greater purity, the material was dissolved in ethyl alcohol and the active material precipitated therefrom by absolute ether. An overall recovery of 25% was obtained.

This last step is not normally necessary, but serves as a check step to insure a pure product.

Example 19

To 1600 liters of a fermentation mash with an initial pH of 7 was added sufficient 2 molar sulfuric acid to increase the acidity to a pH of 2.4, approximately 59 liters being required. The material was filtered, the cake discarded, 8.5 kilos of barium chloride added, the pH adjusted to 9.5 with 13.3 liters of 10 normal sodium hydroxide, filtered, the cake suspended in 90 liters of water, and the pH thereof adjusted to 2.1 with 9.5 liters of 2 molar sulfuric acid. The slurry formed was filtered, and the cake washed with 75 liters of water adjusted to a pH of 2 with sulfuric acid. The cake was discarded, the filtrate and wash combined, adjusted to a pH of 10.2 with 5.2 liters of 10 normal sodium hydroxide, 185 liters of acetone added, 90 kilos of sodium chloride added, mixed, the acetone layer separated, and the aqueous phase washed with an additional 60 liters of acetone the acetone extracts combined, and the acetone removed under vacuum. An amorphous precipitate was formed as the acetone was removed which was filtered off and recrystallized from dilute hydrochloric acid with a pH of 1, yielding 52 grams of chlortetracycline hydrochloride.

Example 20

1600 liters of a fermentation mash was adjusted to a pH of 1.5 with sulfuric acid, filtered, the filtrate adjusted to a pH of 10 with calcium hydroxide, the solids collected and washed. The cake was slurried and extracted with a total of 200 liters of acetone in three portions at a pH of 1.5, using hydrochloric acid for pH control. The extract was adjusted to a pH of 1.5 and the solvent evaporated. The residual aqueous layer was diluted to 30 liters with water, readjusted to a pH of 1.5, then extracted with 30 liters of chloroform. The chloroform was discarded for later recovery of the solvent. The aqueous residue was adjusted to a pH of 9.5 with sodium hydroxide, and the solids collected on a filter. The solids were re-suspended in water, adjusted to a pH of 1 with hydrochloric acid, a total of 20 liters being obtained, and the resulting chlortetracycline hydrochloride filtered therefrom, and dried. Approximately 30% of the chlortetracycline contained in the original mash was recovered.

*Example 21*

To 1100 liters of a fermentation mash was added approximately 15 liters of 2 molar sulfuric acid to lower the pH to 3. Twenty pounds of "Hy-Flo SuperCel" were added thereto and the solids removed by filtration. To the filtrate was added approximately 12 pounds of calcium hydroxide as a 20% suspension raising the pH to between 9.8 and 10. The solids thereby precipitated were removed and regenerated by slurrying with 15 liters of 2 molar sulfuric acid in 30 liters of water, then the solids removed; the solids were additionally regenerated by a second treatment with 30 liters of water adjusted to a pH of 2 with sulfuric acid followed by a third similar regeneration. The three filtrates had added thereto sodium hydroxide to adjust them to a pH of 9.8 to 10, 110 pounds of sodium chloride and 100 liters of acetone were added, thoroughly mixed, the actone separated, the aqueous layer additionally washed with increments of acetone of 20 liters and 10 liters, the raffinate discarded, the three acetone extracts filtered, and the acetone removed at a temperature of 35° C. under vacuum. The acetone free aqueous layer containing the slurried chlortetracycline was filtered and washed in 150 cc. of distilled water, the resulting cake was mixed with water to a pasty consistency, concentrated hydrochloric acid added dropwise to a pH of 1.2, cooled in an ice bath, the crystals formed filtered, washed with three washes of cold absolute alcohol, total volume being approximately 200 milliliters, and the crystals formed were dried in a vacuum, resulting in an overall recovery of between 25 and 30%.

*Example 22*

To 1000 liters of fermentation mash containing about 3000 micrograms of chlortetracycline per milliliter resulting from the fermentation of a nutrient medium containing 9 grams per liter of calcium carbonate with *Streptomyces aureofaciens* were added 10 kilograms of diatomaceous earth (the commercial product Hy-Flo) and 7 kilograms of magnesium silicate (the commercial product Magnesol) and the pH was adjusted to 7.5 with 25% sodium hydroxide. The mixture was thoroughly stirred and then filtered on a vacuum drum filter.

The wet filter cake may be dried and used as an ingredient for animal feed, being sold under the commercial name of "Aurofac."

The filter cake while still wet may be slurried in 400 liters of butanol and acidified with 35% hydrochloric acid to a pH of 1.5, the solids separated on a centrifuge, and the clear liquid treated with 1 kilogram of charcoal. After stirring for a half hour the charcoal is filtered off and to the filtrate is added 8.5 kilograms of sodium chloride. The mixture was again agitated and allowed to settle. The solvent phase containing the chlortetracycline is separated from the brine, concentrated in vacuo at 30° to 40° C. to approximately 25 liters and the chlortetracycline hydrochloride separated out as crystals. With high potency mash a yield of about 2 kilograms may be expected. The product is pure enough for pharmaceutical use after only one recrystallization from 2-ethoxy-ethanol.

*Example 23*

The variation in the calcium content of calcium chlortetracycline may be shown by carrying out the precipitation in the absence of sufficient calcium for complete reaction with the chlortetracycline. Neutral chlortetracycline was prepared by dissolving 10.3 grams (0.02 mol) of chlortetracycline hydrochloride in 1 liter of carbon dioxide free water and filtering; the solution was neutralized by adding a 0.04 normal calcium hydroxide solution and stirring until the pH reached 5.4; the neutral or amphoteric form of chlortetracycline precipitated; the neutral chlortetracycline was removed on a sintered glass filter, washed with ethanol and ether. A small portion of the precipitate thus formed was ashed. It was found to be substantially free from calcium, as there was no appreciable residual ash.

After drying, three 1 gram portions were each dissolved in 2 liters of carbon dioxide free water.

To the first portion was added 1 equivalent of calcium ion as .04 normal calcium hydroxide; precipitation occurred. The precipitate was very difficult to filter. (In texture it resembles freshly precipitated aluminum hydroxide.) Only a part of the precipitate was collected and dried for analysis. The precipitate was found to have 1.44 equivalents of calcium per mol of chlortetracycline. The remaining unfiltered portion was allowed to stand overnight, and a portion then decanted and filtered for bioanalysis of the supernatant liquid. The solution was found to have a pH of 7.2. After standing overnight, the supernatant liquor was found to analyze 151 micrograms of chlortetracycline per milliliter, showing that approximately 31% of the chlortetracycline remained in the supernatant liquid.

To a second portion was added 1.5 equivalents of calcium hydroxide per mol of chlortetracycline which resulted in a liquid having a pH of 7.9; and a precipitate containing 1.67 equivalents of calcium per mol of chlortetracycline. The supernatant liquid contained approximately 21 micrograms of chlortetracycline per milliliter.

To the third portion was added two equivalents of calcium hydroxide, resulting in a liquid with a pH of 9.9 and precipitate which analyzed 2.01 equivalents of calcium per mol of chlortetracycline. The supernatant liquid contained 4.6 micrograms of chlortetracycline per milliliter.

Barium, strontium and magnesium salts give similar results.

Having thus described certain specific forms of our invention, it will be understood that the exact quantities given in the examples by way of pH's, quantities and yields are as examples only and slight variations in the mash, the exact strain of *Streptomyces aureofaciens*, and other unavoidable causes will influence the yield so that the exact details may be readily varied by those skilled in the art for a specific batch. As mentioned above other materials than lime, such as an aqueous suspension of lime, or unslaked lime may be used, the lime slaking itself as added. Similarly, barium, strontium, magnesium may be used for the bivalent metal, and other alkalis such as potassium, ammonium or lithium may be used where indicated for pH control. The hydroxides of the bivalent metals serve both purposes when added to the solutions. Commercially, because of price considerations and convenience, lime is the most convenient, but naturally the other products may be used when they are more available. Hydrochloric acid is particularly convenient particularly in the later stages. Sulfuric acid may be used giving the sulphate rather than the hydrochloride at the various stages as desired. It is more desirable that the hydrochloride be used than the sulfate when prepared for administration as a drug because the sulfate ion is not desirable in the animal system and the sulfate does not as readily crystallize. Others acids as indicated may be used for the purification.

Having set forth by description and example certain aspects thereof, as our invention we claim:

1. A process for the harvesting of chlortetracycline containing mash which comprises acidifying the mash to a pH of less than about 3, separating and removing the solids, increasing the pH of the resultant liquid to between about 6 and 10 in the presence of, per mol of chlortetracycline, at least about one equivalent of alkaline earth metal ions selected from the group consisting of calcium ions, barium ions, strontium ions, and magnesium ions, and separating the resultant precipitate of chlortetracycline as a salt of a metal selected from the group consisting of calcium, barium, strontium and magnesium.

2. A process for the harvesting of chlortetracycline containing mash which comprises acidifying the mash to a pH of less than about 3 with a mineral acid selected from the group consisting of hydrochloric acid, sulfuric acid, nitric acid and phosphoric acid, separating and removing the solids, increasing the pH of the resultant liquid to between about 6 and 10 in the presence of at least about one equivalent of calcium ions per mol of chlortetracycline, and separating the resultant precipitate of calcium chlortetracycline.

3. A process for the harvesting of chlortetracycline containing mash which comprises acidifying the mash to a pH of less than about 3 with hydrochloric acid, separating and removing the solids, increasing the pH of the resultant liquid to between about 6 and 10 in the presence of at least about one equivalent of calcium per mol of chlortetracycline and separating the resultant precipitate of calcium chlortetracycline.

4. A process for the harvesting of chlortetracycline containing mash which comprises acidifying the mash to a pH of less than about 3 with sulfuric acid, separating and removing the solids, increasing the pH of the resultant liquid to between about 6 and 10 in the presence of at least about one equivalent of calcium per mol of chlortetracycline and separating the resultant precipitate of calcium chlortetracycline.

5. A process for the harvesting of chlortetracycline containing fermentation liquor which comprises acidifying the fermentation liquor to a pH of less than about 3 with hydrochloric acid, removing any solids, adding sufficient calcium ions to insure that there is an excess present over that required to precipitate all of the recoverable chlortetracycline, raising the pH to between 6 and 10 and separating the resultant solid calcium salt of chlortetracycline.

6. The method which comprises increasing the pH of an aqueous solution containing chlortetracycline and fermentation impurities, free of insoluble matter and having a pH of less than about 3 to between about 6 and 10 in the presence of, per mol of chlortetracycline, at least about one equivalent of alkaline earth metal ion selected from the group consisting of calcium ions, barium ions, strontium ions and magnesium ions and separating the resulting precipitate of chlortetracycline as a salt with an alkaline earth metal selected from the group consisting of calcium, barium, strontium and magnesium from the residual liquid.

7. The method which comprises increasing the pH of an aqueous solution containing chortetracycline and fermentation impurities, free of insoluble matter and having a pH of less than about 3 to between about 6 and 10 in the presence of, per mol of chlortetracycline, at least about one equivalent of calcium ions and separating the resulting precipitate of calcium chlortetracycline.

8. A calcium salt of chlortetracycline, said salt being the product which precipitates from an aqueous solution containing chlortetracycline and at least about one equivalent of calcium ions when the pH of said solution is raised to above pH 6.

References Cited in the file of this patent

UNITED STATES PATENTS

| | | |
|---|---|---|
| 2,482,055 | Duggar | Sept. 13, 1949 |
| 2,516,080 | Sobin et al. | July 18, 1950 |
| 2,586,766 | Pidacks et al. | Feb. 19, 1952 |
| 2,609,329 | Niedercorn | Sept. 2, 1952 |
| 2,640,842 | Weidenheimer et al. | June 2, 1953 |
| 2,655,535 | Pidacks et al. | Oct. 13, 1953 |

OTHER REFERENCES

Science News Letter, Apr. 12, 1952, p. 231.

Harned et al.: "Annals of the New York Academy of Science," vol. 51, Art. 2, pages 182 and 183, Nov. 30. 1948.